(12) United States Patent
Jiang et al.

(10) Patent No.: US 12,529,753 B2
(45) Date of Patent: Jan. 20, 2026

(54) HYBRID INDOOR POSITIONING SYSTEM

(71) Applicant: Orion go Co., Ltd., Taipei (TW)

(72) Inventors: Jun-Bang Jiang, Taipei (TW);
Shih-Hsin Liu, Taipei (TW);
Shao-Yung Huang, Taipei (TW)

(73) Assignee: Orion go Co., Ltd., Taipei (TW)

( * ) Notice: Subject to any disclaimer, the term of this patent is extended or adjusted under 35 U.S.C. 154(b) by 469 days.

(21) Appl. No.: 17/970,356

(22) Filed: Oct. 20, 2022

(65) Prior Publication Data

US 2023/0135277 A1    May 4, 2023

(30) Foreign Application Priority Data

Nov. 4, 2021   (TW) .................................. 110141218

(51) Int. Cl.
*G01S 5/02*      (2010.01)
*G01S 5/00*      (2006.01)

(52) U.S. Cl.
CPC .......... *G01S 5/02585* (2020.05); *G01S 5/017* (2020.05); *G01S 5/0036* (2013.01); *G01S 5/02522* (2020.05); *G01S 5/0263* (2013.01)

(58) Field of Classification Search
CPC ...... G01S 5/02585; G01S 5/0036; G01S 5/01; G01S 5/017; G01S 5/0263; G01S 5/02521; G01S 5/02522; G01C 21/1654; G01C 21/206
USPC ................................................. 342/450, 451
See application file for complete search history.

(56) References Cited

U.S. PATENT DOCUMENTS

| | | | |
|---|---|---|---|
| 9,020,752 B2* | 4/2015 | Lundquist | G01S 5/02522 |
| | | | 701/434 |
| 9,326,103 B2* | 4/2016 | Shen | H04W 4/025 |
| 9,677,888 B2* | 6/2017 | Tornqvist | G01C 17/38 |
| 9,769,622 B2* | 9/2017 | Patel | H04W 4/33 |
| 9,841,507 B2* | 12/2017 | Waters | G01S 19/48 |
| 10,254,383 B2* | 4/2019 | Bradley | G01S 5/18 |
| 10,451,708 B2* | 10/2019 | Sarkar | H04W 4/029 |
| 10,697,778 B2* | 6/2020 | Shu | G01C 21/206 |
| 11,085,772 B2* | 8/2021 | Shu | G01C 21/206 |

(Continued)

FOREIGN PATENT DOCUMENTS

CN    114791286 A *  7/2022 ............. G01C 21/20

*Primary Examiner* — Chuong P Nguyen
(74) *Attorney, Agent, or Firm* — Che-Yang Chen; Law Office of Michael Chen (57) ABSTRACT

A hybrid indoor positioning system comprises an electronic label provided with an acceleration sensing module, a first direction sensing module, a second direction sensing module and an operational module, the acceleration sensing module generates an acceleration signal, the operational module receives the acceleration signal and generates a movement data, the first direction sensing module and the second direction sensing module respectively generate a first direction signal, a magnetic force information and a second direction signal, the operational module receives the first direction signal and the second direction signal and generates a direction data, the electronic label is provided with a signal receiving module that generates an ambient wireless signal, the movement data and the direction data of the operational module are transmitted to a signal sending module; and a remote server, the remote server has a central processing unit, a signal receiving unit and a judgment model.

11 Claims, 7 Drawing Sheets

(56) References Cited

U.S. PATENT DOCUMENTS

| | | | |
|---|---|---|---|
| 11,604,247 B2* | 3/2023 | Bradley | G01S 5/18 |
| 11,743,687 B2* | 8/2023 | Hapola | G01C 21/1654 |
| | | | 455/456.1 |
| 2012/0203453 A1* | 8/2012 | Lundquist | G01C 21/16 |
| | | | 701/434 |
| 2014/0171107 A1* | 6/2014 | Kao | G01S 5/0264 |
| | | | 455/456.1 |
| 2016/0363448 A1* | 12/2016 | Tornqvist | G01C 17/38 |
| 2021/0120369 A1* | 4/2021 | Pinho | A61B 5/681 |

* cited by examiner

HYBRID INDOOR POSITIONING SYSTEM

BACKGROUND OF THE INVENTION

Field of Invention

The invention relates to an indoor positioning system, and more particularly to a hybrid indoor positioning system capable of computing a positioning result by combining a user's inertial momentum with an ambient wireless signal and an ambient magnetic force in an indoor field, thereby achieving precise positioning and reducing set up costs.

Related Art

At present, the common indoor positioning technologies can mainly be divided into wireless signal positioning, image visual positioning, optical sensor positioning and inertial positioning. Wherein the signal types of wireless signal positioning include wireless signal technologies such as Bluetooth, UWB, RFID, Wi-Fi, wireless signal positioning is achieved by setting up multiple wireless signal sources in the field, and using a signal receiving device with algorithms such as AOA, TOA, triangular positioning, fingerprint positioning to compute the absolute position of the receiving device in the field. But the wireless signal of signal positioning technology will be affected by ambient factors, such as indoor structure or indoor structure materials, which will cause the wireless signal to oscillate, and the condition of unstable wireless signal will cause the signal positioning result to drift constantly, relatively causing difficulties in actual positioning.

Wherein the image visual positioning mainly uses computer vision to collect images from the entire field, it is mainly combined with AI model training such as YOLO algorithm for model training. In application, a camera lens is used to capture the surrounding ambient pictures and input the AI model to obtain the positioning position, but the image visual positioning is very dependent on the ambient complexity, if the ambient appearance is too monotonous, the positioning accuracy will be greatly reduced.

Wherein the optical sensor positioning is achieved by scanning and modeling the field environment by using optical sensors of invisible light such as laser and infrared ray, it mainly needs to have a transmitting end and a receiving end to accurately compute the distance between the equipment and the scanning point, and the ambient model is established by 360-degree surround method, which is then used as the basis for positioning. But the optical sensor is an expensive device, it also requires stable operating conditions and is not suitable for being placed on the user as a wearable device, so the application is relatively limited by situations.

Wherein the inertial positioning mainly uses the motion data collected by the terminal inertial sensor to measure the speed, direction, acceleration of the object, and then obtains the position information of the object through various computations based on dead reckoning, but with the increase of walking time, the error of its inertial navigation positioning is also continuously accumulated, so the problem of errors increasing with time occurs.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above problems, a main object of the invention is to provide a hybrid indoor positioning system capable of computing a positioning result by combining a user's inertial momentum with an ambient wireless signal and an ambient magnetic force in an indoor field, thereby achieving precise positioning and reducing set up costs.

In order to achieve the above object, the invention provides a hybrid indoor positioning system comprising an electronic label, the electronic label is configured by a user, the electronic label is provided with an acceleration sensing module, a first direction sensing module, a second direction sensing module and an operational module, wherein the acceleration sensing module senses movement of the user and generates an acceleration signal, the operational module receives the acceleration signal and generates a movement data, the first direction sensing module and the second direction sensing module sense the movement of the user and generate a first direction signal and a second direction signal respectively, the operational module receives the first direction signal and the second direction signal and generates a direction data, the electronic label is provided with a signal receiving module to receive an ambient wireless information within a range that can be received by the user and to generate an ambient wireless signal, the movement data and the direction data of the operational module are transmitted to a signal sending module; and a remote server, the remote server has a central processing unit and a signal receiving unit, the signal receiving unit receives the movement data, the direction data and the ambient wireless signal which are transmitted to the central processing unit, at least one field map data and an ambient signal database are set up in the remote server, the ambient signal database has a plurality of wireless signal combination data and a plurality of corresponding coordinate data, the central processing unit captures the ambient wireless signal and compares with the wireless signal combination data and generates an initial coordinate information, the central processing unit also captures the movement data and the direction data and compares with the field map data and generates a movement information, so that the remote server is capable of acquiring a user's starting position through the coordinate information and acquiring a user's moving direction through the movement information and generating a real-time coordinate information.

According to one embodiment of the hybrid indoor positioning system of the invention, wherein the electronic label further has a label identification code, the label identification code is transmitted by the signal sending module to the signal receiving unit, so that the central processing unit is capable of simultaneously capturing the movement data, the direction data, the ambient wireless signal and the label identification code.

According to one embodiment of the hybrid indoor positioning system of the invention, wherein the wireless signal combination data comprise at least one network domain combination information and at least one network domain signal strength information.

According to one embodiment of the hybrid indoor positioning system of the invention, wherein the ambient signal database further comprises a sampling extension data.

According to one embodiment of the hybrid indoor positioning system of the invention, wherein the field map data comprise a movable area and an immovable area.

According to one embodiment of the hybrid indoor positioning system of the invention, wherein the remote server further comprises a step database, the step database is electrically connected to the central processing unit, the central processing unit captures the movement data that is compared with the step database, and then compares the compared movement data and the direction data with the field map data and generates the movement information.

According to one embodiment of the hybrid indoor positioning system of the invention, wherein the first direction sensing module senses a user's ambient magnetic force and generates a magnetic force information, and the signal sending module receives the magnetic force information.

According to one embodiment of the hybrid indoor positioning system of the invention, wherein the remote server further comprises a judgment model, the signal receiving unit receives the magnetic force information and transmits the magnetic force information to the judgment model, the judgment model captures the magnetic force information and generates a corresponding coordinate information and transmits the corresponding coordinate information to the central processing unit, and the central processing unit generates a positioning position by computing the real-time coordinate information and the corresponding coordinate information, so that the remote server is capable of acquiring a user's real-time position through the positioning position.

According to one embodiment of the hybrid indoor positioning system of the invention, wherein the remote server further comprises a data cleaning module, the data cleaning module is signally connected to the signal receiving unit and the judgment model, the data cleaning module receives the magnetic force information and generates a cleaning data that is transmitted to the judgment model, and the judgment model captures the cleaning data and generates the corresponding coordinate information.

According to one embodiment of the hybrid indoor positioning system of the invention, wherein the signal receiving unit receives an acceleration data and a direction data and transmits the acceleration data and the direction data to the judgment model, the judgment model captures the magnetic force information, the acceleration data and the direction data and generates a corresponding coordinate information and transmits the corresponding coordinate information to the central processing unit, and the central processing unit generates a positioning position by computing the real-time coordinate information and the corresponding coordinate information, so that the remote server is capable of acquiring a user's real-time position through the positioning position.

According to one embodiment of the hybrid indoor positioning system of the invention, wherein the remote server further comprises a data cleaning module, the data cleaning module is signally connected to the signal receiving unit and the judgment model, the data cleaning module receives the magnetic force information, the acceleration data and the direction data, and generates a cleaning data that is transmitted to the judgment model, and the judgment model captures the cleaning data and generates the corresponding coordinate information.

According to one embodiment of the hybrid indoor positioning system of the invention, wherein the central processing unit captures the ambient wireless signal and compares with the wireless signal combination data and generates an ambient coordinate information, and the central processing unit generates the positioning position by computing the real-time coordinate information, the corresponding coordinate information and the ambient coordinate information, so that the remote server is capable of acquiring a user's real-time position through the positioning position.

DETAILED DESCRIPTION OF THE INVENTION

The above object of the invention, as well as its structural and functional features, will be described in accordance with the preferred embodiments of the accompanying drawings.

In the following, for the formation and technical content related to a hybrid indoor positioning system of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numerals.

Figure 1:
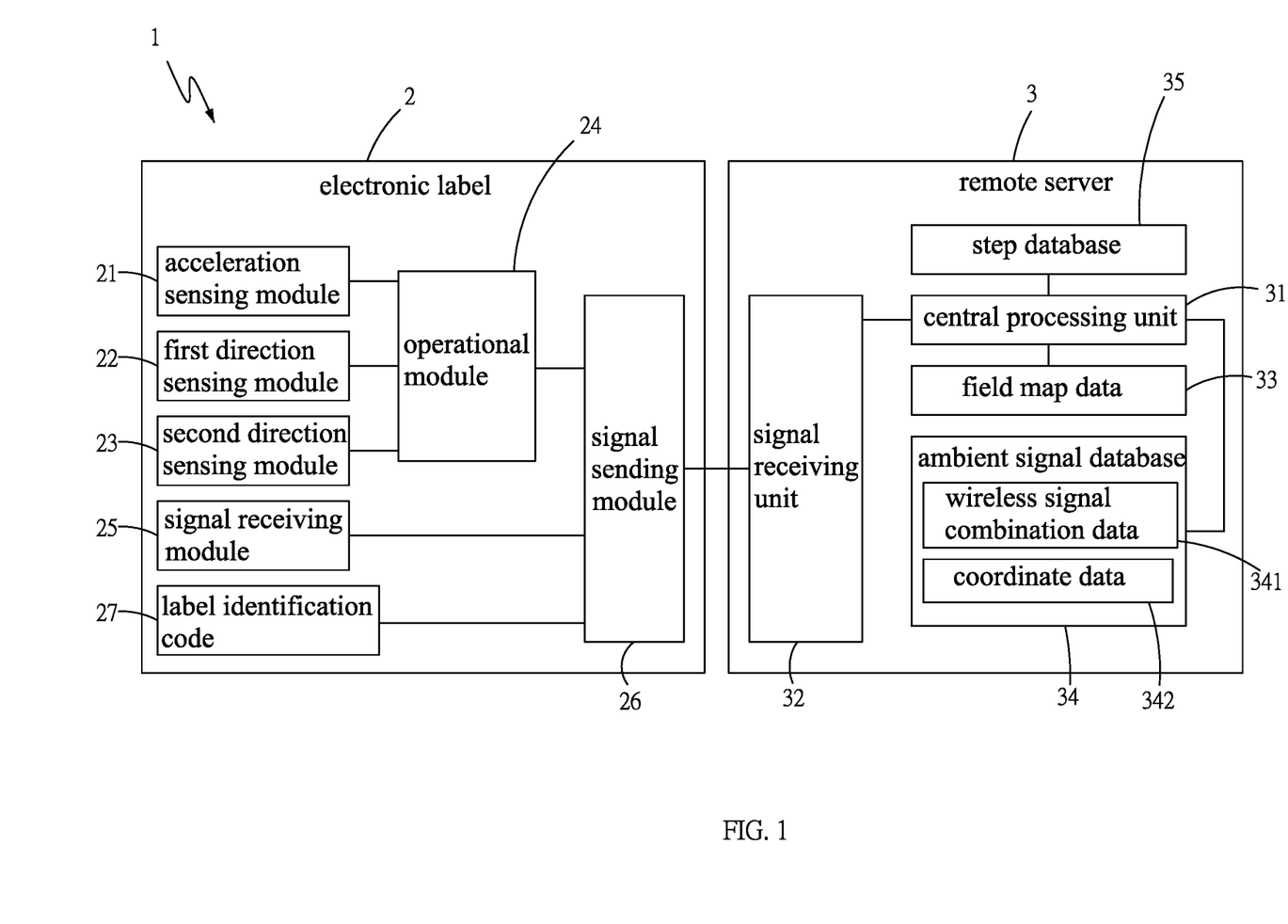
FIG. 1 is a block diagram of a hybrid indoor positioning system of the invention.

Firstly, please refer to FIG. 1 for a block diagram of a hybrid indoor positioning system 1 of the invention. It can be clearly seen from the figure that the hybrid indoor positioning system 1 comprises an electronic label 2 and a remote server 3.

Wherein the electronic label 2 is provided with an acceleration sensing module 21, a first direction sensing module 22, a second direction sensing module 23 and an operational module 24, wherein the acceleration sensing module 21 is an accelerometer, the first direction sensing module 22 is a magnetometer, the second direction sensing module 23 is a gyroscope, and wherein the electronic label 2 further has a signal receiving module 25, a signal sending module 26 and a label identification code 27.

Figure 2:
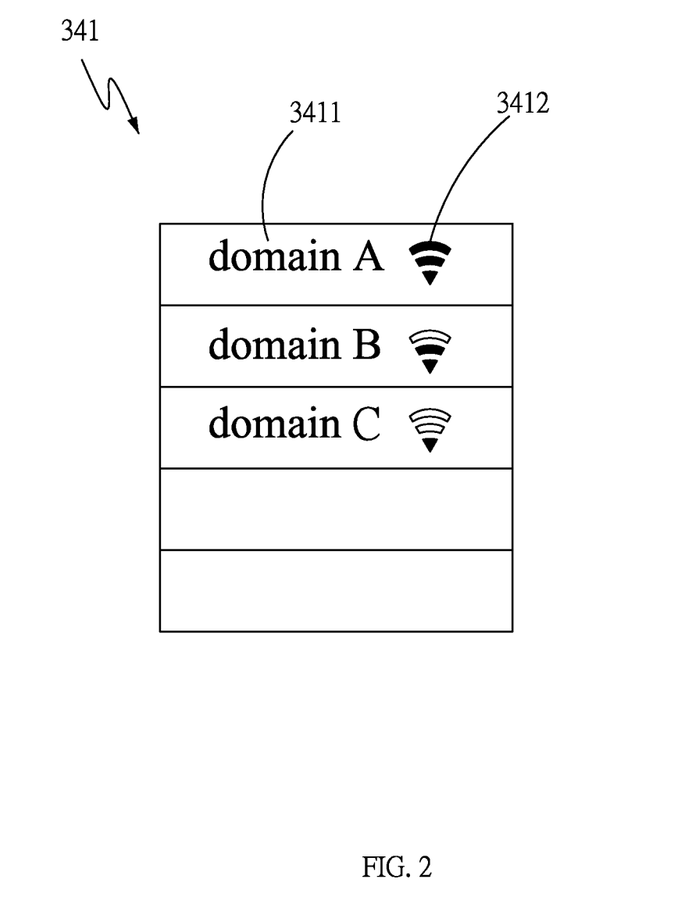
FIG. 2 is a schematic diagram of wireless signal combination data of the hybrid indoor positioning system of the invention.
Figure 4:
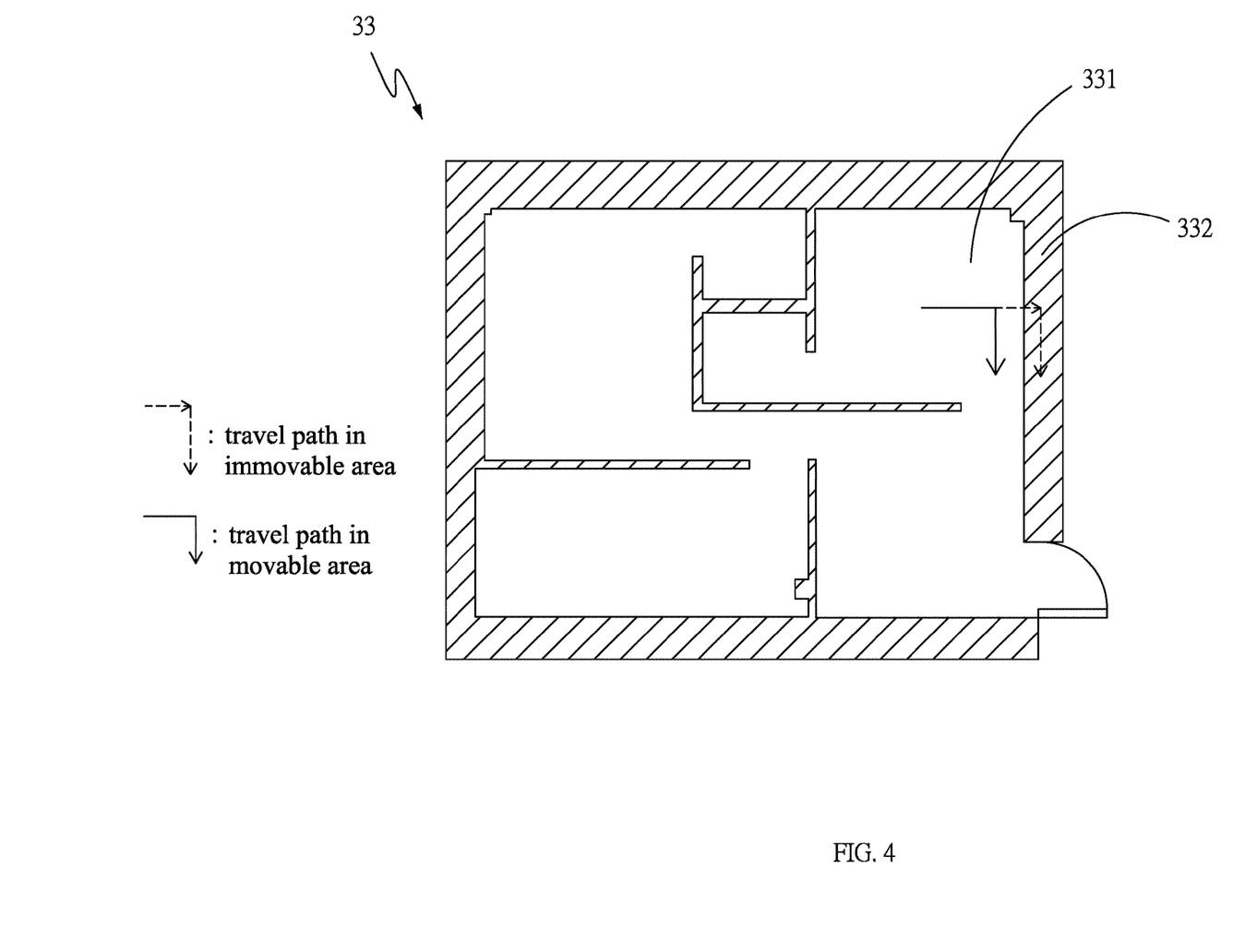
FIG. 4 is a schematic diagram of travel path in a movable area and an immovable area of the hybrid indoor positioning system of the invention.

The remote server 3 has a central processing unit 31 and a signal receiving unit 32, the central processing unit 31 is electrically connected to the signal receiving unit 32, and the signal receiving unit 32 is signally connected to the signal sending module 26. At least one field map data 33, an ambient signal database 34 and a step database 35 are set up in the remote server 3, the field map data 33 and the ambient signal database 34 are set up before the hybrid indoor positioning system 1 is put into use. Wherein the field map data 33 is a floor plan of building information and can be 2D or 3D, so the field map data 33 comprises a movable area 331 and an immovable area 332 (as shown in FIG. 4). Wherein the movable area 331 is an area that the user can move or can be moved therein such as elevator, aisle or room, the immovable area 332 is an object that the user cannot move or traverse therein, such as wall or column, the ambient signal database 34 comprises a plurality of wireless signal combination data 341 and a plurality of coordinate data 342, the wireless signal combination data 341 comprises at least one network domain combination information 3411 and a network domain signal strength information 3412 (as shown in FIG. 2), wherein when the ambient signal database 34 is set up, a builder tests and samples wireless signal conditions in an indoor environment first, as shown in FIG. 2. Assuming wireless signal conditions displayed at a coordinate position (125, 50) comprise domain A, domain B and domain C, the domain A, the domain B and the domain C are the network domain combination information 3411, or hardware device ID (BSSID) that generates network domain signals of the domain A, the domain B and the domain C is the network domain combination information 3411, and the domain A, the domain B and the domain C have their respective displayed network domain signal strength information 3412, the network domain combination information 3411 and the network domain signal strength information 3412 are used to create the wireless signal combination data 341, and the wireless signal combination data 341 correspond to the coordinate data 342 of the coordinate position (125, 50), and so on. The builder tests the network domain combination information 3411 and the coordinate data 342 of coordinate positions in an indoor environment, and after the builder has tested multiple sets of the network domain combination information 3411 and the coordinate data 342 in the indoor environment, the remote server 3 calculates each set of the network domain combination information 3411 and the coordinate data 342 into an ambient signal model through machine learning algorithm, random forest algorithm, and stores the ambient signal model in the ambient signal database 34, wherein when data in the ambient signal database 34 are used, the cleaned wireless signal combination data 341 and the coordinate data 342 can be generated through data cleaning first. The central processing unit 31 is signally connected to the field map data 33 and the ambient signal database 34, and the step database 35 is set up with different step distances for different users.

Figure 3:
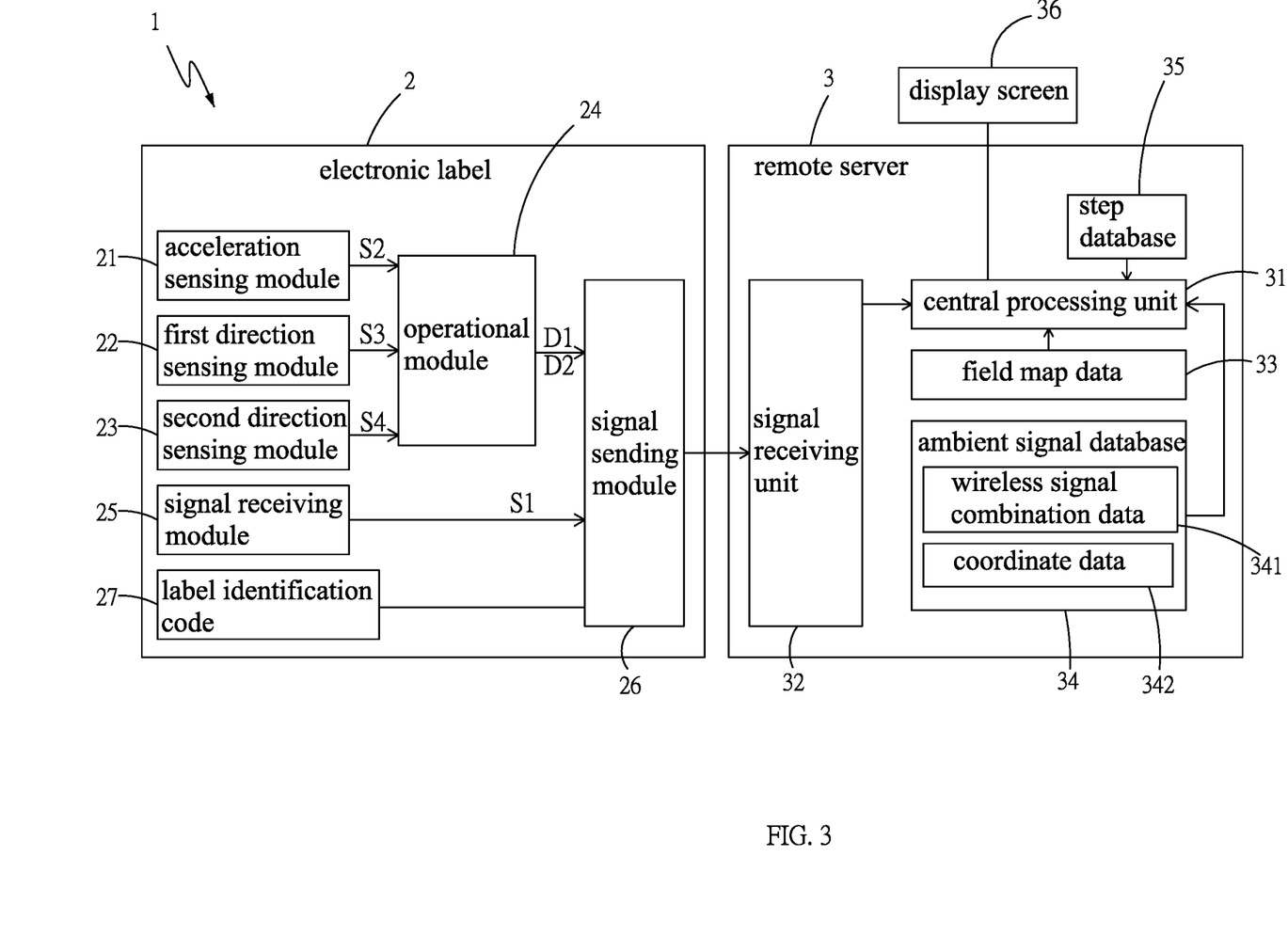
FIG. 3 is a first block diagram of the hybrid indoor positioning system of the invention.

Then, please refer to FIG. 3 for a first block diagram of the hybrid indoor positioning system of the invention, wherein when a user is equipped with the electronic label 2 and enters an indoor environment, the signal receiving module 25 of the electronic label 2 first receives wireless signal conditions in the environment, so the signal receiving module 25 receives the network domain combination information 3411 and the network domain signal strength information 3412, and the signal receiving module 25 transmits the network domain combination information 3411 and the network domain signal strength information 3412 to the signal receiving unit 32 by an ambient wireless signal S1 through the signal sending module 26. The central processing unit 31 captures the label identification code 27 and the ambient wireless signal S1, the central processing unit 31 calculates into an ambient signal model through algorithms such as machine learning algorithm, random forest algorithm, the central processing unit 31 compares the coordinate data 342 corresponding to the ambient signal model calculated by algorithm from the network domain combination information 3411 and the coordinate data 342, and then generates an initial coordinate information. The initial coordinate information is a starting position of the user, after the builder captures the starting position of the user, the electronic label 2 of the user is positioned from the starting position, and the initial coordinate information can be displayed on a display screen 36 with the field map data 33, or the remote server 3 can be a cloud system, and the cloud system enables a smart device at an application end to access the starting coordinate position through API and the starting coordinate position is displayed on a screen of the smart device.

When the user is equipped with the electronic label 2 to move in the field map data 33, the acceleration sensing module 21 senses the user's movement and generates an acceleration signal S2, the operational module 24 receives the acceleration signal S2 and generates a movement data D1 through a peak detection algorithm, wherein the acceleration signal S2 is mainly a waveform signal with periodic changes generated by its moving speed, and the operational module 24 captures a number of crests of the waveform signal and then calculates a number of moving steps from the number of crests. For example: when a person is walking, each time he takes a step, the continuously generated acceleration signal S2 will form a waveform of crests and troughs. Therefore, a number of crests can be used to determine a number of moving steps, and the movement data D1 is transmitted to the signal receiving unit 32 via the signal sending module 26. The central processing unit 31 captures the movement data D1 and compares the movement data D1 with the step database 35, and the step database 35 stored in the remote server 3 is set up with different step distances for different users. For example, a step for an adult is 60 cm, and a step for a child is 40 cm, a moving distance of the user can be converted by using a number of moving steps obtained through the above and the step database 35, and conversion of the moving distance only needs to be performed once for the same target. For example, when a crest is generated and the user is an adult, it can be judged that the user has moved 60 cm.

When the user is equipped with the electronic label 2 to move in the field map data 33, the first direction sensing module 22, which is a magnetometer, senses a moving direction of the user and generates a first direction signal S3, and the second direction sensing module 23, which is a gyroscope, generates a second direction signal S4, the first direction signal S3 and the second direction signal S4 are transmitted to the operational module 24, and the operational module 24 receives the first direction signal S3 and the second direction signal S4 and generates a direction data D2 through a four-element compensation correction algorithm, and then transmits the direction data D2 to the central processing unit 31, so that through the direction data D2, the central processing unit 31 is capable of determining an absolute direction of the electronic label 2, such as orientation of facing east or west or south or north. However, the first direction sensing module 22, which is a magnetometer, is easily interfered by ambient magnetic field. In order to prevent the first direction sensing module 22 from being interfered by magnetic field of a surrounding environment, resulting in inaccurate determination of orientation, signals generated by the second direction sensing module 23, which is a gyroscope, are used for comparison and correction to obtain a relatively accurate orientation, so the second direction sensing module 23, which is a gyroscope, generates the second direction signal S4, so that through the direction data D2, the central processing unit 31 is capable of determining a relative direction of the electronic label 2 in order to obtain a relatively accurate orientation. Specifically: because signals of the gyroscope are not easily interfered by environment, they are used to compare and correct signals of the magnetometer, and signals of the gyroscope are related to a starting orientation, so it is called a relative direction. For example, when a starting orientation is based on the east, a display angle of the gyroscope is 0 degree. When the direction turns to the south, the angle changes to positive 90 degrees. On the contrary, if a starting orientation is facing the south, at this time, it is based on the south, and a display angle is minus 90 degrees when the direction is turned to the east. Therefore, when a starting orientation is known, changes of its angle can be used to judge a current direction. Therefore, the hybrid indoor positioning system 1 is capable of confirming an orientation of the user through the first direction signal S3 and the second direction signal S4 obtained by the first direction sensing module 22 and the second direction sensing module 23, if the first direction signal S3 is interfered by ambient magnetic field during movement, the second direction signal S4 can be used to correct orientation easily. For example, when the first direction signal S3 and the second direction signal S4 are judged by the operational module 24 to face inconsistency, at this time, the first direction signal S3 may be interfered ambiently, the operational module 24 can compute a relatively accurate orientation by using the first direction signal S3 and the second direction signal S4. For example, a direction determined by the first direction signal S3 faces south, while the second direction signal S4 determines that the direction is southeast, an orientation computed by the operational module 24 is south-south-east, and the orientation is between the orientations determined by the two signals. Therefore, a relatively accurate orientation can be obtained through correction. In addition, the central processing unit 31 captures the movement data D1 and the direction data D2 and compares with the field map data 33 and generates a movement information, and therefore movement information of the user in the field map data 33 can be determined stably. Through the initial coordinate information the remote server 3 is capable of acquiring a starting position of the user, and through the movement information the remote server 3 is capable of acquiring a moving direction of the user, and a real-time coordinate information is generated. Thereby, after the central processing unit 31 determines an absolute direction, a relative direction and a moving distance of the user through the movement data D1 and the direction data D2, a facing position, a movement information and a real-time coordinate information of the user can be acquired. The facing position, the movement information and the real-time coordinate information can also be displayed on the display screen 36 with the field map data 33. Further, when the operational module 24 receives the first direction signal S3 and the second direction signal S4, the operational module 24 can simultaneously receive the acceleration signal S2. The operational module 24 uses a four-element compensation correction algorithm to compute the acceleration signal S2, the first direction signal S3 and the second direction signal S4 in order to calculate the direction data D2 with three-axis changes, and accuracy of the direction data D2 can be improved through more correction information.

As shown in FIG. 4, the central processing unit 31 is capable of further optimizing the movement data D1 and the direction data D2. The central processing unit 31 is capable of calculating displacement of the user by using moving distance and travel direction with collision processing algorithm or discrepancy correction algorithm or multi-path algorithm or particle filter algorithm, and superimposing position coordinates of a previous position to calculate its movement track and optimize its movement track in order to reduce the occurrence of judgment errors caused by accumulated errors. The optimization method is that the central processing unit 31 can be used for correction with the field map data 33. If travel direction is within the movable area 331, travel direction can be continuously positioned. Otherwise, if travel direction is within the immovable area 332, travel direction will be restored to a coordinate position of a previous reasonable position. After judging the absolute direction and relative direction and moving distance of the user through the movement data D1 and the direction data D2 again, travel direction can be corrected, or travel direction can be displayed by the display screen 36 or displayed by a smart device at an application end after computed by a cloud system. Thereby the hybrid indoor positioning system 1 of the invention is capable of calculating positioning result by combining the user's inertial momentum with the ambient wireless signal in an indoor field to achieve an efficacy of precise positioning and reducing set up costs.

Furthermore, if the movement data D1 received by the central processing unit 31 do not change within a set time, the central processing unit 31 uses the movement data D1 to determine a position of the user to see if the user has not moved or the acceleration sensing module 21 is faulty, so as to achieve an object of fault detection and positioning a position of the user.

Figure 5:
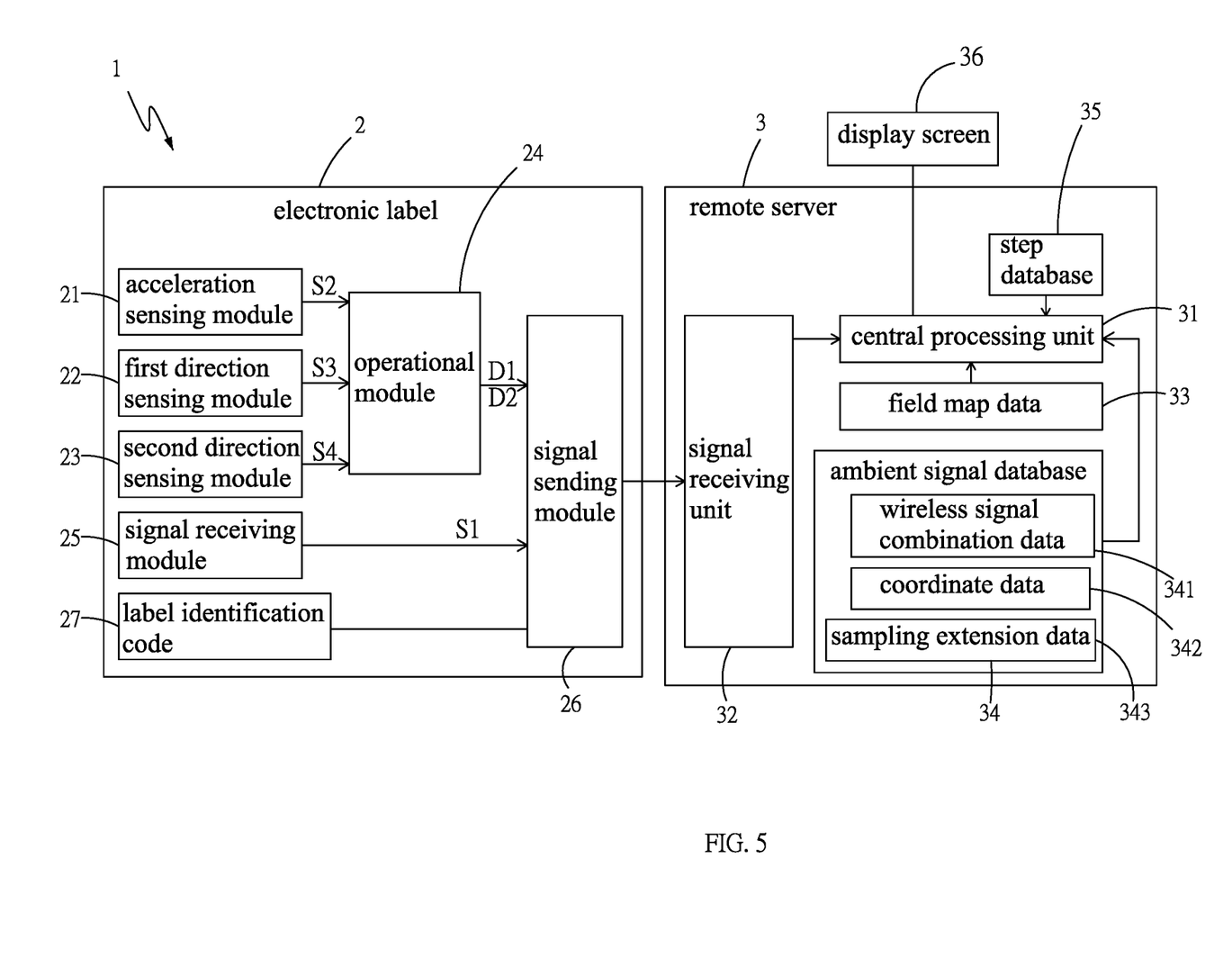
FIG. 5 is a second block diagram of the hybrid indoor positioning system of the invention.

Then, please refer to FIG. 5 for a second block diagram of the hybrid indoor positioning system of the invention, wherein the ambient signal database 34 further comprises a sampling extension data 343, wherein the sampling extension data 343 are data operationally amplified in the ambient signal database 34 by the builder based on a data normal distribution algorithm after the ambient signal database 34 is set up. The sampling extension data 343 are used to increase signal volume of comparable wireless signals, and its sampling data generate the sampling extension data 343 through calculation, so that the central processing unit 31 is capable of adding information of the sampling extension data 343 for comparison, and also making the coordinate data 342 generated by the central processing unit 31 more accurate.

Figure 6:
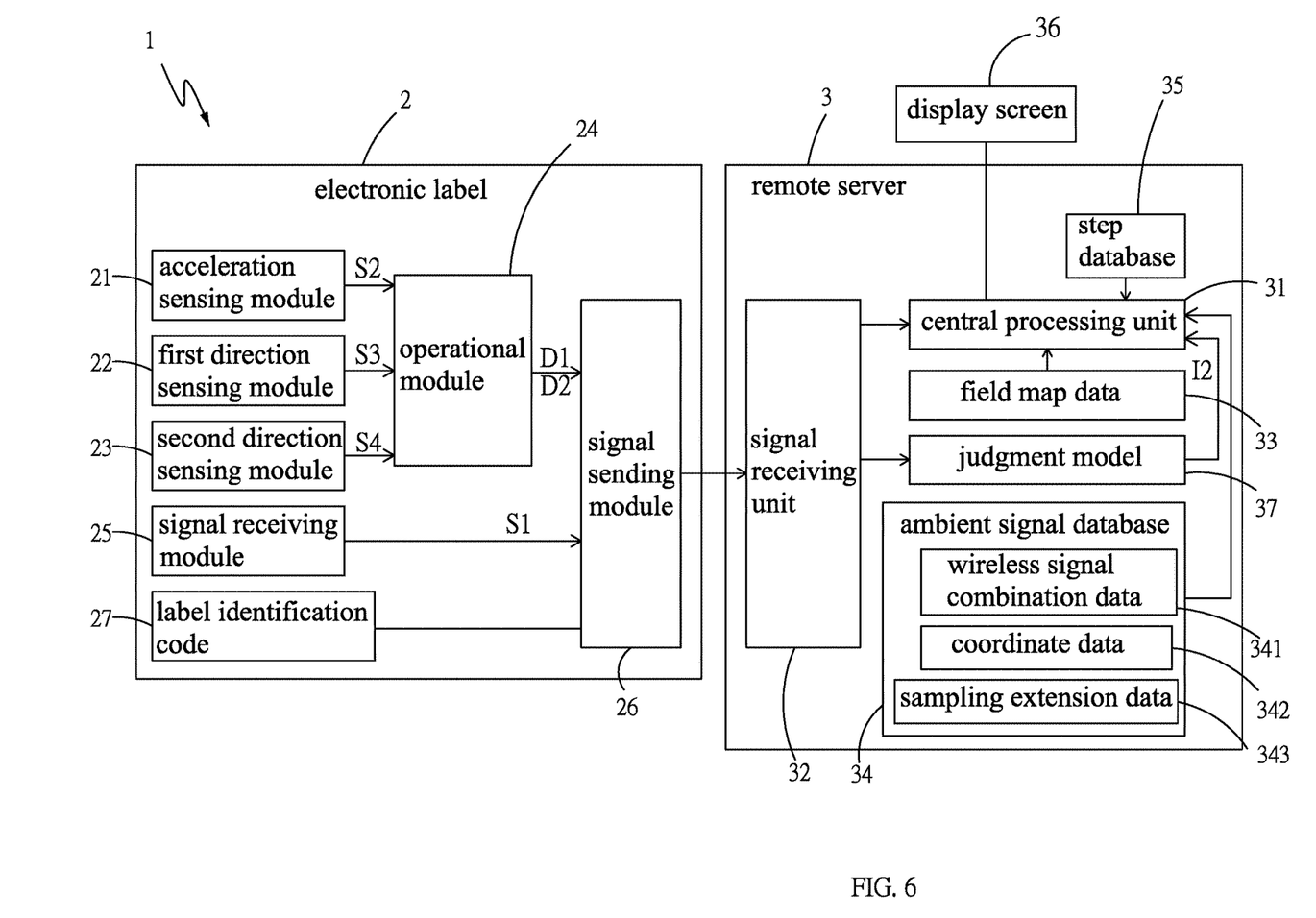
FIG. 6 is a third block diagram of the hybrid indoor positioning system of the invention.

Then, please refer to FIG. 6 for a third block diagram of the hybrid indoor positioning system of the invention, wherein the remote server 3 further comprises a judgment model 37, and the judgment model 37 can be an AI learning model or a DTW dynamic time warping calculation model, wherein when the judgment model 37 is an AI learning model, the AI learning model can be a neural network model, a deep learning model, a machine learning model, etc., multiple locations in a positioning environment and corresponding coordinate information and corresponding magnetic force information of each location are acquired and used for training to obtain the judgment model 37 serving as an AI learning model; when the judgment model 37 is a DTW dynamic time warping calculation model, the judgment model 37 further comprises a magnetic force database. The magnetic force database comprises at least one corresponding time magnetic force parameter data and at least one corresponding magnetic force coordinate data. The time magnetic force parameter data are magnetic force information measured within a period of time, and the magnetic force coordinate data are location coordinates for obtaining the time magnetic force parameter data.

Wherein the first direction sensing module 22 senses the user's ambient magnetic force and generates a magnetic force information I1, the magnetic force information I1 is a magnetic signal of a current position measured by the user using a magnetometer. The signal sending module 26 receives the magnetic force information I1, the signal sending module 26 transmits the magnetic force information I1 to the signal receiving unit 32, and the signal receiving unit 32 transmits the magnetic force information I1 to the judgment model 37. Wherein when the judgment model 37 is an AI learning model, the judgment model 37 captures the magnetic force information I1 and generates a corresponding coordinate information I2 and transmits the corresponding coordinate information I2 to the central processing unit 31, the central processing unit 31 generates a positioning position through the real-time coordinate information and the corresponding coordinate information I2 using a particle filter algorithm, so that the remote server 3 is capable of acquiring a real-time position of the user through the positioning position. Because the same set of judgment system will inevitably have errors, the positioning position comprehensively determined using the corresponding coordinate information I2 obtained by the added judgment model 37 and the aforementioned real-time coordinate information is more stable, reliable and universal than that obtained using a single system.

In addition, in addition to comparing the network domain combination information 3411 with the coordinate data 342 corresponding to the ambient signal model computed by algorithm, the central processing unit 31 generates the initial coordinate information. The signal receiving module 25 of the electronic label 2 equipped by the user also receives wireless signal conditions in an environment, so the signal receiving module 25 will receive the network domain combination information 3411 and the network domain signal strength information 3412, and the signal receiving module 25 transmits the network domain combination information 3411 and the network domain signal strength information 3412 to the signal receiving unit 32 by the ambient wireless signal S1 through the signal sending module 26. The central processing unit 31 captures the label identification code 27 and the ambient wireless signal S1, and the central processing unit 31 compares the coordinate data 342 corresponding to the ambient signal model calculated by algorithm from the network domain combination information 3411 and the coordinate data 342, and then generates an ambient coordinate information. Then the central processing unit 31 generates the positioning position through the real-time coordinate information, the corresponding coordinate information I2 and the ambient coordinate information using a particle filter algorithm, so that the remote server 3 is capable of acquiring a real-time position of the user through the positioning position. The positioning position comprehensively determined using the corresponding coordinate information I2 and the aforementioned real-time coordinate information obtained by more modules is more stable, reliable and universal than that obtained using a single system.

In addition, when the judgment model 37 is a DTW dynamic time warping calculation model, the judgment model 37 captures the magnetic force information within a period of time and compares with the matched time magnetic force parameter data to generate the corresponding coordinate information I2 from the magnetic force coordinate data corresponding to the time magnetic force parameter data. The central processing unit 31 generates a positioning position through the real-time coordinate information and the corresponding coordinate information I2 using a particle filter algorithm, so that the remote server 3 is capable of acquiring a real-time position of the user through the positioning position.

Figure 7:
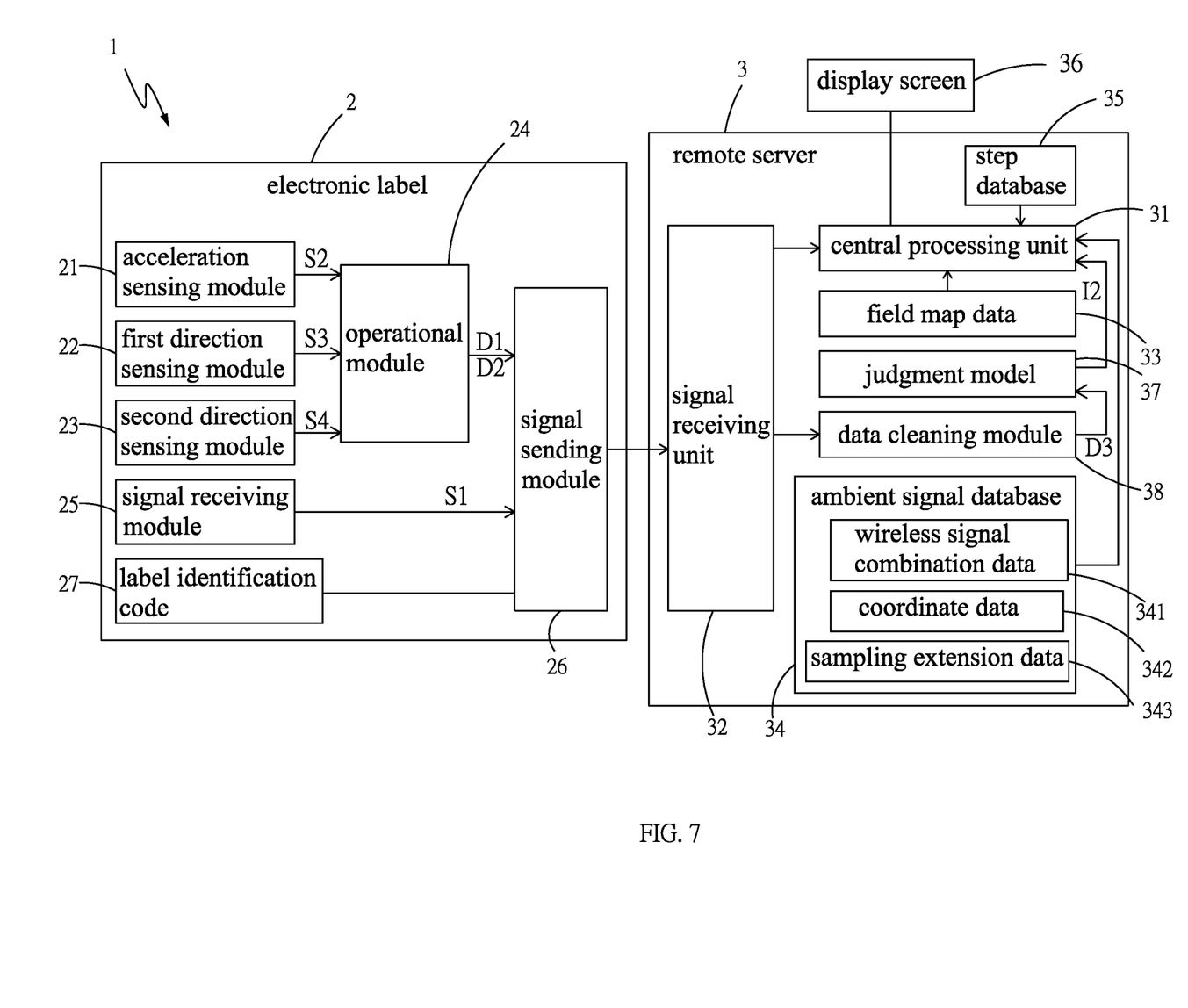
FIG. 7 is a fourth block diagram of the hybrid indoor positioning system of the invention.

Then, please refer to FIG. 7 for a fourth block diagram of the hybrid indoor positioning system of the invention, wherein the remote server 3 further comprises a data cleaning module 38, the data cleaning module 38 is signally connected to the signal receiving unit 32 and the judging model 37, and the data cleaning module 38 receives the magnetic force information I1 and performs data processing such as field misplacement, null value processing, field elimination, normalization, and generates a cleaning data D3 which is transmitted to the judgment model 37, wherein with the data cleaning module 38 provided, the judgment model 37 is an AI learning model which is trained based on acquiring multiple positions and corresponding coordinate information of each position in a positioning environment and the corresponding cleaning data D3. Therefore, the magnetic force information I1 first passes through the data cleaning module 38 and generates the cleaning data D3, the judgment model 37 captures the cleaning data D3 and generates the corresponding coordinate information I2 which is transmitted to the central processing unit 31, and the central processing unit 31 generates a positioning position through the real-time coordinate information and the corresponding coordinate information I2 using a particle filter algorithm, so that the remote server 3 is capable of acquiring a real-time position of the user through the positioning position. The AI learning model trained through the cleaning data D3 is capable of making the AI learning model more accurate when judging a position of the corresponding coordinate information I2.

In addition, when the judgment model 37 is a DTW dynamic time warping calculation model, with the data cleaning module 38 provided, the magnetic force database stores the time magnetic force parameter data and the magnetic force coordinate data after being treated by the cleaning data D3. The data cleaning module 38 receives the magnetic force information within a period of time and performs data processing such as field misplacement, null value processing, field elimination, normalization, and generates the cleaning data D3. In addition, the magnetic force information I1 first passes through the data cleaning module 38 and generates the cleaning data D3. The judging model 37 captures the cleaning data D3 and compares with the matched time magnetic force parameter data processed with data cleaning to generate the corresponding coordinate information I2 based on the magnetic force coordinate data corresponding to the time magnetic force parameter data processed with data cleaning. The central processing unit 31 generates a positioning position through the real-time coordinate information and the corresponding coordinate information I2 using a particle filter algorithm, so that the remote server 3 is capable of acquiring a real-time position of the user through the positioning position. The magnetic force database created through the cleaning data D3 is capable of making the DTW dynamic time warping calculation model more accurate when judging a position of the corresponding coordinate information I2.

In addition, the signal receiving unit 32 is capable of further receiving an acceleration data and a direction data and transmit the acceleration data and the direction data to the judgment model 37, and the judgment model 37 captures the magnetic force information, the acceleration data and the direction data. When the judging model 37 is an AI learning model, each position in a positioning environment and corresponding coordinate information of each position, and the magnetic force information I1, the acceleration data and the direction data are acquired first for training before the judging model 37 can be served as an AI learning model.

Alternatively, the data cleaning module 38 receives the magnetic force information I1, the acceleration data and the direction data, and generates the cleaning data D3 and transmits the cleaning data D3 to the judgment model 37. The judgment model 37 captures the cleaning data D3 and performs learning and training again, and the judgment model 37 after learning and training captures the magnetic force information I1 or a label of the cleaning data D3 and generates the corresponding coordinate information I2 and transmits the corresponding coordinate information I2 to the central processing unit 31. The central processing unit 31 generates a positioning position through the real-time coordinate information and the corresponding coordinate information I2 using a particle filter algorithm, so that the remote server 3 is capable of acquiring a real-time position of the user through the positioning position. The AI learning model trained with more parameters is capable of making the AI learning model more accurate when judging a position of the corresponding coordinate information I2.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. A hybrid indoor positioning system comprising:
an electronic label, the electronic label being configured by a user, the electronic label being provided with an acceleration sensing module, a first direction sensing module, a second direction sensing module and an operational module, wherein the acceleration sensing module senses movement of the user and generates an acceleration signal, the operational module receives the acceleration signal and generates a movement data, the first direction sensing module and the second direction sensing module sense the movement of the user and generate a first direction signal and a second direction signal respectively, the operational module receives the first direction signal and the second direction signal and generates a direction data; the user is equipped with the electronic label, and the electronic label is provided with a signal receiving module to receive an ambient wireless information within a range that can be received and to generate an ambient wireless signal, the movement data and the direction data of the operational module are transmitted to a signal sending module; and
a remote server, the remote server having a central processing unit, a signal receiving unit and a step database, the signal receiving unit receiving the movement data, the direction data and the ambient wireless signal and transmitting the movement data, the direction data and the ambient wireless signal to the central processing unit, at least one field map data and an ambient signal database being set up in the remote server, the ambient signal database having a plurality of wireless signal combination data and a plurality of corresponding coordinate data, the central processing unit capturing the ambient wireless signal and comparing with the wireless signal combination data and generating an initial coordinate information, the central processing unit also capturing the movement data and the direction data and comparing with the field map data and generating a movement information, so that the remote server being capable of acquiring a user's starting position through the coordinate information and acquiring a user's moving direction through the movement information and generating a real-time coordinate information; wherein
the ambient wireless information refers to wireless signals transmitted from wireless signal sources within the environment;
the ambient wireless signal comprises a network domain combination information and a network domain signal strength information;
the step database is electrically connected to the central processing unit, the central processing unit captures the movement data that is compared with the step database, and then compares the compared movement data and the direction data with the field map data and generates the movement information.

2. The hybrid indoor positioning system as claimed in claim 1, wherein the electronic label further has a label identification code, the label identification code is transmitted by the signal sending module to the signal receiving unit, so that the central processing unit is capable of simultaneously capturing the movement data, the direction data, the ambient wireless signal and the label identification code.

3. The hybrid indoor positioning system as claimed in claim 1, wherein the wireless signal combination data comprise at least one of the network domain combination information and at least one of the network domain signal strength information.

4. The hybrid indoor positioning system as claimed in claim 1, wherein the field map data comprise a movable area and an immovable area.

5. The hybrid indoor positioning system as claimed in claim 1, wherein the first direction sensing module senses a user's ambient magnetic force and generates a magnetic force information, and the signal sending module receives the magnetic force information.

6. The hybrid indoor positioning system as claimed in claim 5, wherein the remote server further comprises a judgment model, the signal receiving unit receives the magnetic force information and transmits the magnetic force information to the judgment model, the judgment model captures the magnetic force information and generates a corresponding coordinate information and transmits the corresponding coordinate information to the central processing unit, and the central processing unit generates a positioning position by computing the real-time coordinate information and the corresponding coordinate information, so that the remote server is capable of acquiring a user's real-time position through the positioning position.

7. The hybrid indoor positioning system as claimed in claim 6, wherein the remote server further comprises a data cleaning module, the data cleaning module is signally connected to the signal receiving unit and the judgment model, the data cleaning module receives the magnetic force information and generates a cleaning data that is transmitted to the judgment model, and the judgment model captures the cleaning data and generates the corresponding coordinate information.

8. The hybrid indoor positioning system as claimed in claim 6, wherein the signal receiving unit receives an acceleration data and a direction data and transmits the acceleration data and the direction data to the judgment model, the judgment model captures the magnetic force information, the acceleration data and the direction data and generates the corresponding coordinate information and transmits the corresponding coordinate information to the central processing unit, and the central processing unit generates a positioning position by computing the real-time coordinate information and the corresponding coordinate information, so that the remote server is capable of acquiring a user's real-time position through the positioning position.

9. The hybrid indoor positioning system as claimed in claim 8, wherein the remote server further comprises a data cleaning module, the data cleaning module is signally connected to the signal receiving unit and the judgment model, the data cleaning module receives the magnetic force information, the acceleration data and the direction data, and generates a cleaning data that is transmitted to the judgment model, and the judgment model captures the cleaning data and generates the corresponding coordinate information.

10. The hybrid indoor positioning system as claimed in claim 8, wherein the central processing unit captures the ambient wireless signal and compares with the wireless signal combination data and generates an ambient coordinate information, and the central processing unit generates the positioning position by computing the real-time coordinate information, the corresponding coordinate information and the ambient coordinate information, so that the remote server is capable of acquiring a user's real-time position through the positioning position.

11. The hybrid indoor positioning system as claimed in claim 6, wherein the judgment model further comprises a magnetic force database, the magnetic force database comprises at least one corresponding time magnetic force parameter data and at least one corresponding magnetic force coordinate data, the judgment model captures the magnetic force information and compares with the matched time magnetic force parameter data to generate the corresponding coordinate information from the magnetic force coordinate data corresponding to the time magnetic force parameter data.

* * * * *